United States Patent [19]

Horwat et al.

[11] 4,004,049
[45] Jan. 18, 1977

[54] SPRAYABLE LATEX ADHESIVE SYSTEMS PROVIDING RAISED SPACED DEPOSITS OF ADHESIVE AND LAMINATES PREPARED THEREFROM

[75] Inventors: David W. Horwat, Morristown; Albert T. Goldberg, Summit, both of N.J.

[73] Assignee: National Starch and Chemical Corporation, Bridgewater, N.J.

[22] Filed: Dec. 8, 1975

[21] Appl. No.: 638,317

[52] U.S. Cl. .......................... 427/207 C; 156/291; 156/327; 156/354; 427/256; 427/421; 428/195; 428/198; 428/339

[51] Int. Cl.² ...................... B05D 1/02; B05D 5/10; B32B 3/10; B32B 7/14

[58] Field of Search .......... 428/198, 521, 195, 341, 428/339; 427/207, 256, 421, 207 C; 156/291, 334, 327

[56] References Cited

UNITED STATES PATENTS

| | | | |
|---|---|---|---|
| 3,364,063 | 1/1968 | Satas | 427/421 |
| 3,625,795 | 12/1971 | Knechtges | 428/198 |
| 3,850,673 | 11/1974 | Nelson | 428/198 |

Primary Examiner—J.C. Cannon
Attorney, Agent, or Firm—Edwin M. Szala; Ellen T. Dec

[57] ABSTRACT

Laminates are formed by providing a pressure sensitive adhesive latex characterized by a Hamilton Beach grit value of 0.03 to 3.0 and an average particle size of less than 0.5 microns and spraying the adhesive onto the substrate to be laminated with pressure sufficient to atomize and destabilize the latex. This method is particularly suitable in applications wherein at least one substrate is a relatively porous material.

7 Claims, No Drawings

SPRAYABLE LATEX ADHESIVE SYSTEMS PROVIDING RAISED SPACED DEPOSITS OF ADHESIVE AND LAMINATES PREPARED THEREFROM

BACKGROUND OF THE INVENTION

I. Field of the Invention:

This invention relates to an improved method for bonding surfaces by spraying with a pressure sensitive adhesive latex. The resultant sprayed adhesive surface is characterized by the appearance of a pebbly, particulate pattern of adhesive thereby providing better efficiency of bonding, rapid and superior wet grab, as well as superior overall coverage at lower quantities for economy of use. This method is particularly effective when bonding lightweight material such as fiberglass insulation.

II. Brief Description of the Prior Art:

In many bonding applications where it is necessary to bond a porous material (e.g. fiberglass insulation, foam material, etc.) to a relatively rigid and often irregularly shaped substrate, certain unique properties, particularly a rapid "wet grab" ability, are required of the adhesive. This wet grab can usually be obtained by coating the substrate surface with an organic solvent-based adhesive and allowing the solvent to evaporate. The use of such solvents presents a number of serious problems including flammability, toxicity and attack on various substrates. Consequently, attempts have been made to achieve efficient bonding and satisfactory wet grab using latex adhesive systems. Generally these latex systems require drying after bonding in order to evaporate the water. This drying operation is particularly difficult in the case of insulation or other relatively thick substrates because it is necessary to force-dry through the entire thickness of the material. Furthermore, in the cases of these latices which must be so dried, the final degree of tack is often insufficient for the intended application and delamination occurs. Moreover, latices employed a highly viscous form and characterized by a "wet grab" due solely to their high viscosity and resulting wet cohesive strength present problems in spraying and efficient application.

It has been recognized that laminates obtained by bonding the substrates with spaced deposits of a coagulated latex adhesive produce superior laminates. Particularly in the cases wherein at least one of the substrates to be bonded is a porous material, the use of the adhesive in this coagulated particulate form has even more significance since the resultant adhesive coated surface possesses a superior degree of wet grab without the necessity for a drying operation. Certain mechanical means, such as grooved or patterned transfer rolls, have been developed to achieve this series of spaced adhesive deposits, however, the costs of the required equipment is high and the use thereof has been limited to flat or regular surfaces.

In U.S. Pat. No. 3,808,088 issued to the B. F. Goodrich Company, a bonding process has been disclosed for spraying an adhesive latex for the deposition of raised, spaced deposits. It is noted in the patent that, despite the obvious practical advantages achievable by spraying, this method of application had not been previously thought practical for use with latex based adhesive systems. Thus, it had been considered that for a binder to be sprayed it must possess a viscosity less than about 2000 cps., however, if latex adhesive droplets contact a substrate in such an unthickened state, they do not remain as discrete droplets but rather coalesce into a continuous adhesive layer and, with certain types of porous substrates, the latex is adsorbed. In order to overcome this problem, the 3,808,088 patent employs an adhesive latex containing from 0.01 to 25% carboxyl functionality. When this latex is sprayed through an atmosphere containing a volatile basic compound, the viscosity of the adhesive rapidly increases to about 10,000 cps. prior to contacting the substrate. This prior art method is relatively expensive requiring elaborate equipment to create the basic atmosphere causing health hazards and undesirable fumes concomitant with the release of these volatile components into the environment.

It is therefore desirable and the main object of this invention to provide a method for spraying an adhesive directly onto a substrate surface so as to form a particulate pattern with high wet grab characteristics without the need for elaborate equipment or specific environments.

A further object of the present invention is to provide a method for spraying latex adhesives which will produce a particulate spray pattern with a breaking of the emulsion or coagulation upon spraying and which can be employed to produce high quality laminates with little or no drying.

SUMMARY OF THE INVENTION

We have now found that laminates having improved bonding properties and resistance to delamination can be prepared by spraying at least one surface of the material to be laminated with a latex pressure sensitive adhesive having a controlled degree of instability. For purposes of this invention, the expression "a controlled degree of instability" means that the latex is stable on storage for a period of up to 6 months to 2 years as well as with mild agitation such as that experienced during moderate pumping, but destabilizes or coagulates upon application of high shear rates and severe mechanical agitation such as are present in conventional spraying processes. Specifically, the laminates of the present invention are prepared by providing a pressure sensitive adhesive latex characterized by a Hamilton Beach grit value of 0.03 to 3.0 preferably 0.1 to 0.5 and an average particle size of less than 0.5 microns, and spraying the adhesive onto the substrate to be laminated with sufficient pressure to atomize and destabilize the latex.

The resultant adhesive coated substrate is characterized by its superior immediate wet grab and permanent tack without the necessity for a drying operation. The bonded laminate is moisture-resistant and highly resistant to delamination. Moreover, as an additional feature, by varying the backbone of the adhesive latex system, other desirable properties such as fire retardance, high heat resistance, oxidation, smoke and impact resistance may also be achieved.

It is preferred in producing the laminates of the present invention that at least one of the substrates comprise a relatively porous and flexible material. Suitable substrates would therefore include fibrous glass, jute, plastic foam, fabrics, burlap cloth, asphalt-impregnated waffle felt, etc. Laminates may thus be prepared in the forms of insulation, films and sound-deadening material bonded to metal heating and cooling ducts or to building board and other construction surfaces. It is to be noted that laminates may be formed readily from polystyrene foam since the latex adhesives may be sprayed directly on the polystyrene due to the absence of organic solvent. Laminates may also be formed using vinyl foams where plasticizer-resistance is required.

DESCRIPTION OF THE PREFERRED EMBODIMENTS

Any pressure sensitive adhesives capable of being utilized in the form of an aqueous emulsion may be employed in the practice of the present invention. Particularly useful pressure sensitive adhesives are those containing major amounts of the alkyl acrylates as are known in the art. Generally the latter adhesives are formed from interpolymers of monomers consisting essentially of one or more alkyl acrylates containing up to about 18 carbon atoms in the alkyl group optionally, in the presence of one or more other copolymerizable monomers. The preferred alkyl acrylates have an average of from 4 to 10 carbon atoms in the alkyl groups and include butyl acrylate, amyl acrylate, hexyl acrylate, heptyl acrylate, octyl acrylate, nonyl acrylate, decyl acrylate and various isomers of these acrylates such as isooctyl acrylate and 2-ethylhexyl acrylate. Higher alkyl acrylates can in some instances be used, particularly in combination with the lower alkyl acrylates, whereby the average number of carbon atoms in the alkyl groups is within the desired range. In most cases, it is necessary to have at least about 40 percent by weight of the interpolymer consist of the above alkyl acrylates and in many preferred interpolymers, 60 percent or more is comprised of these monomers. Additionally, there may be included in these acrylate-based adhesive interpolymers up to about 60% by weight of any ethylenically unsaturated copolymerizable comonomers such as are conventionally employed in the art. Exemplary of such copolymerizable comonomers are the alpha-olefins containing from 2 to 10 carbon atoms, vinyl esters of alkanoic acids containing 3 to 10 carbon atoms such as vinyl acetate and vinyl octoate, ethyl amd methyl esters of methacrylic acid, styrene, vinyl chloride, etc.

In many instances the presence in minor amounts, up to about 10% of polar functional comonomer, such as acrylic, methacrylic, crotonic, itaconic acids, maleic half esters such as methyl, ethyl, butyl, octyl, half esters of maleic acid, acrylamide, methacrylamide, acrylonitrile, methacrylonitrile, etc. is advantageous in improving the properties of the final adhesive.

Another class of pressure sensitive adhesives which may be used herein is represented by the butadiene-based latices containing at least 15 percent by weight butadiene, and preferably interpolymerized with up to about 70 percent by weight styrene or up to about 20 percent by weight acrylonitrile. Additionally, these butadiene-based latices may contain up to about 40 percent by weight, or more of one or more other copolymerizable ethylenically unsaturated comonomers such as previously described.

Furthermore, functional additives such as fire retardants, etc. as well as tackifiers, or other additives may be incorporated into the interpolymer in amounts of up to about 50% by solid weight depending upon the particular additive.

In any event, the ratio of monomers in the interpolymer is selected so that its glass transistor temperature ($T_g$) is in the range of $-10°$ to $-80°$ C., preferably $-20°$ to $-60°$ C. so as to insure adequate pressure sensitive properties. $T_g$ is a measure of a polymer's softness or hardness wherein higher temperatures indicate a relatively harder polymer and lower temperatures indicate a softer polymer. Moreover, the polymers useful herein should have a molecular weight characterized by an intrinsic viscosity in acetone at 30° C. of at least 0.4, preferably about 0.8.

In addition to possessing sufficient pressure sensitive properties and a suitable intrinsic viscosity, the particular adhesive latex must be characterized by a degree of instability such that it possesses a Hamilton Beach grit value of between about 0.03 and 3.0 preferably from 0.1 to 0.5. The Hamilton Beach grit value is a measurement employed in the latex art to determine the degree of mechanical stability in a latex system. The value is obtained by weighing 25.0 g. of the particular latex into a 150 cc glass beaker (3½ tall and 2 inch diameter). The beaker is then clamped to a ring stand and adjusted so that the lower propeller of a Hamilton Beach Mixer (Model No. 33, 2 speed) is covered by the latex. The sample is then agitated at 10,000 RPM for 10 minutes, diluted to about 1:1 proportion with distilled water and filtered through a clean, dry and preweighed 200 mesh stainless steel screen. After rinsing the beaker and screen with distilled water, the screen is placed in a 130° C. oven for 30 minutes. After this period, the screen is cooled and weighed and the number of grams of grit determined. The figure obtained is the Hamilton Beach grit value. If the Hamilton Beach grit value is not within the required range the latex may be carefully adjusted, as will be described hereinbelow, in order that the desired value is achieved.

The latex is generally prepared by emulsion polymerization using anionic or nonionic surfactants or mixtures thereof. Suitable anionic surfactants include sodium dioctyl sulfosuccinate, sodium diamyl sulfosuccinate, sodium dihexyl sulfosuccinate, sodium lauryl sulfate, sodium dodecyl benzene sulfonate, etc. The nonionic surfactants which may be considered exemplary include nonyl or octyl phenoxypolyethoxy ethanol condensates wherein the ethylene oxide content may vary from 5 to 50 moles. Conventionally, two or more of these nonionic surfactants may be employed. Latex preparation is achieved using conventional polymerization methods, however, only approximately half the amount of surfactant normally required to produce a commercially stabilized emulsion is usually employed. Thus, depending upon the specific components, the surfactants will generally be present in amounts of only about 0.30 to 3.0% by weight of the interpolymer in order to provide the required degree of controlled instability.

The latices are usually prepared under batch conditions; however, continuous processing can be employed if desired. The reactor used for the polymerization can be a jacketed kettle having stirring means with provisions to circulate a cooling or heating medium through the jacket of the kettle in order to maintain the desired temperature. The aqueous medium is stirred to maintain dispersion of the monomers and the interpolymer in the aqueous medium. When necessary to achieve a stable latex, the pH of the aqueous medium can be controlled by the addition of various buffering agents. A water-soluble, free radical catalyst such as a water-soluble peracid or salt thereof is often used as the initiating catalyst and this can be used alone or in combination with an active reducing agent in a redox couple. The catalyst is used in conventional concentrations of from about 0.01 to about 2, preferably from about 0.05 to about 0.5, weight percent of the monomers used in the polymerization. If desired, the polymerization medium can also contain a minor quantity, e.g. from about 0.1 to about 5 weight percent, of a protective colloid to improve the adhesiveness of the product. The solids content of the final latex will usually be in the range of 35 to 60% by weight of the total latex. The viscosity of the adhesive is generally quite low, within the range of 25 to 2,000 cps.

In addition to possessing the required controlled degree of instability, it is also found that the adhesive latex useful herein has an average particle size of less than 0.5 $\mu$ generally within the range of 0.1 to 0.5 $\mu$.

As discussed previously, the adhesive latex may be adjusted in order to achieve a workable Hamilton Beach grit value. Thus, in cases where the grit value exceeds 3.0 it may be necessary to enhance the stability of the latex and thereby lower the grit value by the addition of surfactants. In contrast, when the grit value is less than 0.3 the value may be raised by the addition of plasticizers. Alternatively, the grit value may be raised by blending the too stable latex with a batch having a much higher grit value or by adding cationic additives absorbent clays, etc. which will selectively absorb some of the surfactants from the original latex.

We have found that satisfactory adhesive latex systems for use herein generally will have surface tensions greater than about 42 dynes/cm$^2$, however, this value can be considered only as a critical minimum parameter and as such can be used only as a guideline in determining the adequacy of a latex since certain latex systems having acceptable surface tension of 60 to 70 dynes/cm$^2$ do not give the required particulate spray pattern due to their high mechanical stability as measured by the Hamilton Beach grit value.

Adhesive latices containing up to about 60% by weight total polymer solids may be conveniently sprayed. For optimum results, solids concentrations of 35–55% are preferred.

Since any spraying method capable of atomizing the latex and exerting sufficient shear rate to destabilize the latex may be employed, the particular method of spraying is not critical to the production of the laminates. Thus, air, airless or aerosol systems may be employed. However, due to the necessity for fastbreaking of the emulsion, special fluid delivery systems must be employed which prevent premature destabilization under mechanical shear forces. For the latter reason, conventional piston pumps are not preferred for delivery since coagulation of the latex may occur on prolonged pumping and cause a mechanical breakdown. Moreover, low fluid delivery rates and low atomization pressures are advisable since these will minimize "overspray and misting" of the adhesive into the surrounding atmosphere. The fluid delivery system most suitable is a pressurized vessel in combination with conventional air spray equipment. Other suitable delivery methods are airless spray and peristaltic action pumps.

The adhesive to be sprayed is generally delivered into the spray equipment at a rate of about 100–300 wet grams per-minute, preferably about 175–225 grams/-minute. The amount of atomization pressure required will be proportionate to the adhesive delivery rate and will typically range from 10 to 80, preferably 10 to 80 pounds per square inch. Normally, satisfactory bonding of the laminate will be achieved when an amount of 3.0 to 10.0 wet grams of the adhesive is deposited on each square foot of the substrate. Preferably, 5.0 to 7.0 wet grams/ sq. ft. are employed since amounts excessively higher result in waste of the product and amounts appreciably less may cause delamination.

In order to produce satisfactory bonds, the adhesive may be sprayed on either one or both substrates to be laminated. Generally, it is preferred that the metal or non-porous surface be sprayed if only one surface is to be so treated. The adhesive latex sprayed in this fashion will bond lightweight insulation material to bare and painted metal immediately. To ensure hold around different outside corners and for similar high stress applications, it is preferred to partially dry the adhesive for 1 to 2 minutes at 140°–160° F. before making bonds.

Although the process is more useful for the application of the latex to bond certain porous materials, it is generally useful with any material. Thus, while any substrate to be laminated can be sprayed and laminated in accordance with the process of the present invention it is particularly advantageous for use with substrates such as fiberglass, polystyrene foam, asphalt-impregnated waffle felt, etc.

The present invention will be illustrated by the representative examples which follow. All parts by weight unless otherwise stated.

EXAMPLE I

This example illustrates the preparation of a latex suitable for bonding laminates in accordance with the present invention.

The polymerization reactor was first charged with about 63 parts water and about 10 parts butyl acrylate, 0.5 part methacrylic acid, 0.1 part acrylamide, 0.2 part Aerosol MA (Tradename of American Cyanamid surfactant), 0.6 parts octyl phenoxy polyethoxy ethanol and 0.026 parts dodecyl mercaptan. The reactor and its contents were then heated to about 60°–70° C. and 0.07 parts potassium persulfate dissolved in about 9 parts of water was charged with vigorous agitation. The remainder of the monomer mixture (90 parts butyl acrylate and 0.5 parts methacrylic acid) was added over a 4 hour period maintaining the batch at about 75° C. A catalyst surfactant solution consisting of about 12 parts water, 0.2 parts Aerosol MA, 0.2 parts Aerosol OT (Tradename of American Cyanamid surfactant), 1.0 parts octyl phenoxy polyethoxy ethanol non-ionic surfactant with about 35 moles ethylene oxide, 0.3 parts potassium persulfate and 0.1 part sodium hydroxide was added simultaneously. When the slow additions were completed, the batch was held for 1 hour and cooled. The resulting latex contained 55% solids and was essentially free of coagulum. The Hamilton Beach grit value was 1.0, average particle size 0.27 $\mu$, surface tension 46.9 and $T_g$ of approximately −45° C.

Utilizing the procedure of the present invention, the thus produced adhesive latex was applied to a 0.064 inch aluminum plate using a conventional spray gun (Devilbiss MBC having an FX fluid tip and needle and a No. 24 air cap). The latex was sprayed with 10 psig. on the pressure pot (resulting in a fluid delivery rate of about 200 gms/min.) and 20 psig. atomization from the spray gun onto the plate which was clamped in a vertical position in a forced draft chamber equipped with an exhaust fan. The plate was coated at a weight of about 5 wet grams per square foot, and was thereafter immediately laminated to a piece of 3 × 1 × 1 fiberglass of 3 lb./cubic foot density. The pebbly particulate pattern formed by the adhesive on the metal plate resulted in immediate and superior wet grab and an excellent laminate which tore 1 lb./ft.³ density fiberglass when pulled resultant wet tensile strengths are shown in Table I below.

TABLE I

| Sample | Viscosity cps | Surface Tension | Particle Size | Hamilton Beach | Wet Tensile | % NF | Comments |
|---|---|---|---|---|---|---|---|
| I | 90 | 43 | 0.26 | 0.185 | 40 gm | | Coagulated particulate spray pattern |
| II | 60 | 41.8 | 0.29 | 0.126 | 20 | | Smooth film formed - non-particulate with no wet grab - surface tension too low |
| III | * | 51 | 0.15 | 5.5 | — | | Too unstable to spray |
| IV | 30 | 44.5 | 0.51 | 0.084 | 20 gm | | Smooth film - non-particulate particle size too large |
| V | 87 | 43.3 | 0.04 | 0.27 | 60 gm | | Coagulated particulate spray pattern |
| VI | 52 | 44.5 | 0.26 | 0.196 | | 50% | Good results |
| VII | 144 | 46.6 | 0.33 | 0.315 | | 100% | Excellent results |
| VIII | 52 | 42.6 | 0.26 | 0.184 | | 12% | Marginally acceptable - relatively low surface tension |
| IX | 36 | 40.0 | * | 0.016 | | 0% | Surface tension and Hamilton Beach grit too low |
| X | 55 | 40.4 | 0.32 | 0.023 | | 0% | Surface tension and Hamilton Beach grit too low |
| XI | 80 | 45.7 | 0.25 | 0.19 | | 100% | Excellent results |
| XII | 74 | 43.2 | 0.34 | 0.34 | | 100% | Excellent results |
| XIII | 76 | 44.5 | 0.34 | 0.085 | | 87% | Very good results |

*not recorded.

in tensile.

EXAMPLE II

In order to illustrate the superior bond formed by the use of the process of the present invention, an adhesive latex similar to that prepared in Example I was applied to an aluminum plate using the spray technique of the present invention and using conventional brushing technique. The procedure outlined in Example I was employed to form the laminate. In the case of the adhesive which was brushed onto the metal plate, it was also applied at a level of about 5 wet grams per square foot forming a smooth filmed surface.

The wet tensile strength (an indication of wet grab) was then measured by the following procedure. Weights of varying sizes were attached to the fiberglass component of the laminate. The weight increased successively until the downward pull exceeded the wet tensile strength of the adhesive. Thus the maximum value of the weight which was upheld gave a correlation of the degree of wet grab of the adhesive. Several runs were made to get a statistical sampling. The laminate produced by the spraying technique of the present invention exhibited a wet tensile strength of 40 grams while that of the brushed adhesive-coated surface was less than 10 grams, clearly indicating the superior nature of the bonds of the present invention.

For comparative control purposes, a control laminate was prepared utilizing Scotch Grip Insulation Adhesive No. 321 (3M Co.), a conventionally employed insulation adhesive. The adhesive, having a viscosity of 560,000 cps. was brushed onto the metal plate according to instructions so as to form a smooth viscous layer possessing a moderate degree of wet grab. When tested, the laminate was found to have a wet tensile strength of 40 grams.

Using the testing procedure outlined in Example II, other adhesive latices similar to those prepared in Example I but varying in surface tension, particle size and/or Hamilton Beach values were sprayed onto metal surfaces and laminates formed with fiberglass. The

EXAMPLE III

This example illustrates the use of a styrene-butadiene based latex in the formation of laminates in accordance with the present invention.

A latex was prepared at 42.9% solids using a blend of 46% styrene and 54% butadiene. The final latex had a viscosity of 46 cps, a surface tension of 50 dynes/cm², an average particle size of 0.15 micron and a Hamilton Beach grit value of 0.80.

The latex was sprayed in a particulate pattern using the procedure described in Example I and a laminate having superior wet tensile strength and water resistance was obtained.

EXAMPLE IV

This example illustrates how a latex which is too stable to be sprayed in accordance with the invention can be destabilized to improve the wet grab and spray performance.

Latices were prepared using a procedure similar to that used in Example I, however, higher levels of surfactant were employed. (The Hamilton Beach grit value of these latices were less than 0.03.) When the latex was sprayed onto a metal surface and a laminate formed, the resultant bond exhibited only 10% non-failures at a load of 40 grams. The addition of 10 parts per hundred of Santicizer 160 plasticizer (Trademark of Monsanto Chemical Co.) resulted in an improvement to 50% non-failures while the addition of 15 parts per hundred of the plasticizer gave 100% non-failures.

EXAMPLE V

This example illustrates a number of other acrylic-based polymers which may be prepared as latices having the parameters described above and which may then be sprayed in accordance with the present invention.

The general procedure of Example I is followed to prepare the following polymers shown in the Table II below, however, different monomers and monomer ratios are used in order to illustrate a variety of interpolymer useful herein.

TABLE II

| Monomeric Components | Weight Ratio | Hamilton Beach Grit Value | Particle Size |
|---|---|---|---|
| butyl acrylate/vinyl acetate/methacrylic acid | 90/10/1 | 2.2 | 0.4 |
| 2-ethylhexyl acrylate/ butyl acrylate/acrylic acid | 25/75/0.5 | 1.7 | 0.25 |
| 2-ethylhexyl acrylate/ 2-ethylhexyl methacrylate/ 2-hydroxypropyl acrylate | 50/50/1 | 0.47 | 0.35 |
| 2-ethylhexyl acrylate/ methyl acrylate/2-hydroxyethyl acrylate | 60/40/2 | 0.04 | 0.16 |
| 2-ethylhexyl acrylate/ vinyl acetate/acrylic acid | 65/35/2 | 0.84 | 0.29 |

The latices prepared as above produce the desired pebbly particulate pattern when sprayed and thus yield strong, moisture resistant laminated bonds.

In a similar manner, the adhesive latices described herein may be employed to form laminates between polystyrene foams, burlap, asphalt-impregnated waffle felt and another porous or non-porous surface.

We claim:

1. A method for applying an aqueous adhesive polymer latex to a substrate as raised, spaced deposits which comprises spraying an aqueous pressure sensitive adhesive polymer latex having glass transition temperature of $-10°$ to $-80°$ C., a surface tension of at least 42 dynes/cm$^2$, a viscosity of 25 to 2,000 cps, a Hamilton Beach grit value of 0.03 to 3.0 and an average particles size of less than 0.5 microns, said spraying occurring in an atmosphere essentially free of volatile basic compounds at a pressure sufficient to atomize and destabilize the latex.

2. The method of claim 1 wherein the Hamilton Beach grit value is within the range of 0.1 to 0.5.

3. The method of claim 1 wherein the average particle size is within the range of 0.1 to 0.5 microns.

4. The method of claim 1 wherein the latex is formed from interpolymers containing at least 40% of at least one alkyl acrylate containing 1 to 18 carbon atoms in the alkyl group.

5. The method of claim 1 wherein the spraying occurs at an atomization pressure of 10 to 30 pounds per square inch.

6. The method of claim 1 wherein the latex is a butadiene-based latex containing at least 15% by weight butadiene.

7. The method of claim 6 wherein the latex is an interpolymer of 70 percent styrene and 30 percent butadiene.

* * * * *